United States Patent
Alam

(10) Patent No.: US 9,191,797 B2
(45) Date of Patent: Nov. 17, 2015

(54) RESPONSES AND CONTROLS OF INCOMING INFORMATION

(71) Applicant: Ryan R. Alam, Houston, TX (US)

(72) Inventor: Ryan R. Alam, Houston, TX (US)

( * ) Notice: Subject to any disclaimer, the term of this patent is extended or adjusted under 35 U.S.C. 154(b) by 0 days.

(21) Appl. No.: 14/096,486

(22) Filed: Dec. 4, 2013

(65) Prior Publication Data

US 2014/0342704 A1  Nov. 20, 2014

Related U.S. Application Data

(60) Provisional application No. 61/855,530, filed on May 17, 2013.

(51) Int. Cl.
| | |
|---|---|
| H04M 1/725 | (2006.01) |
| H04M 3/32 | (2006.01) |
| H04W 4/16 | (2009.01) |
| H04M 3/42 | (2006.01) |
| H04W 4/02 | (2009.01) |

(52) U.S. Cl.
CPC *H04W 4/16* (2013.01); *H04M 3/42* (2013.01); *H04W 4/023* (2013.01)

(58) Field of Classification Search
CPC .. H04W 4/021; H04W 4/023; H04M 3/42323
USPC ............. 455/412.1, 413; 379/201.02, 210.01; 715/816
See application file for complete search history.

(56) References Cited

U.S. PATENT DOCUMENTS

| | | | |
|---|---|---|---|
| 6,968,052 B2* | 11/2005 | Wullert, II | 379/210.01 |
| 7,941,762 B1* | 5/2011 | Tovino et al. | 715/816 |
| 8,577,000 B1 | 11/2013 | Brown | |
| 2005/0141687 A1* | 6/2005 | Ozugur et al. | 379/201.02 |
| 2006/0166654 A1* | 7/2006 | Ackermann-Markes | 455/414.1 |
| 2007/0167170 A1* | 7/2007 | Fitchett et al. | 455/456.1 |
| 2013/0097270 A1 | 4/2013 | Plotkin | |
| 2013/0210393 A1* | 8/2013 | Hillier | 455/413 |
| 2013/0218622 A1* | 8/2013 | MacKenzie et al. | 705/7.19 |

OTHER PUBLICATIONS

Change your presence status, Microsoft Office Online—Lync 2010.*
Quick Start: Use instant messaging and presence, Microsoft Office Online—Lync 2010.*
Lync & Skype Connectivity—for use with Lync 2010.*

* cited by examiner

*Primary Examiner* — William Nealon
(74) *Attorney, Agent, or Firm* — Qiang Hao; Hao Law, PC.

(57) ABSTRACT

The present invention is related to a method of allowing a recipient to control responses from his or her communication device when the recipient is unavailable to receive incoming information. More specifically, the present invention is related to a method of delivering a corresponding message to a sender of the incoming information when the sender sends the incoming information to the recipient during a status of unavailability. Even more specifically, the present invention is related to a method that allow the sender to be notified with the status of unavailability of the recipient in real-time thus avoid sending the incoming information during said status.

7 Claims, 11 Drawing Sheets

RESPONSES AND CONTROLS OF INCOMING INFORMATION

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND

1. Field of the Invention

The present invention is related to a method of controlling and responding to information arrived at a communication device such as a cell phone when a user of the communication device is unavailable.

2. Description of Related Art

The number of active cell phones will reach 7.3 billion by 2014. On average, a cell phone user makes or receives 14-33 calls, 5-21 text messages, 35-40 emails, and other notifications like those from social media such as Facebook or Twitter every day.

However, not all incoming information, being calls, text messages or emails, is of importance and/or time-sensitiveness. The incoming information arriving to a cell phone at a wrong time and/or a wrong place, despite its contents, might not serve a recipient as a user of the cell phone well.

For example, a professional may not want to receive a hello call from her long-time friend in high-school during an office meeting. Or for another example, a driver might not want to check the text message while driving a moving vehicle. Thus, such incoming information may be classified as "unwanted information." According to a study by Pew Research Center, 42% of cell phone users agree that they "get irritated when an incoming call or text on a cell phone interrupts" them.

The unwanted information may distract the already stressed mobile networks in the US as well as other countries. In a recent study by the Pew Internet & American Life Project, dropped calls were cited as the biggest complaint by cell phone owners. According to the study, 72% of cell phone owners experienced dropped calls at least occasionally, and 32% experience this at least a few times a week. That's an enormous number of people who are frustrated on a regular basis. The biggest reason cited for dropped calls is the over-worked cellular networks and limited number of cell towers that control the cellular signal to manage the extreme cell traffic of the towers. The issue of drop calls becomes even more significant in metro cities such as downtown New York, Chicago, or Mainland China, Bombay India etc. Wireless providers keep increasing the size and configuration of their mobile network to increase efficiency, meet the demands and eliminate issues such as drop calls. A real effort to control the unwanted information is now important and necessary.

More urgently, cell phone use leads to more than 120,000 vehicle crashes each year. In 2012, 2,600 people, mostly under the age of 26, died on US highways using cell phone while driving.

Thus, an effective control of the incoming information during a particular schedule, being in meeting, sleeping, dinning or driving, would be critical in enhancing wireless network's efficiency, promoting professional conducts, enjoying private moments, and saving lives.

In addition to Federal and State regulations to restrict cell phone under certain circumstances such as during driving, several products and cell phone applications have already been developed targeting the unwanted information.

AT&T's DriveMode application allows the cell phones to send an auto-reply message while the users carrying the cell phones are driving. When DriveMode is activated, all calls are automatically sent to voicemail as if the phone is off. Moreover, the user is also unable to use the phone. However, there is no system by which the user can retrieve missed calls and messages even after the driving has ended. Because of the complete disconnect feature of DriveMode application, the incoming information having importance and/or time-sensitiveness may also be disregarded.

Other products or applications, such as Cellcontrol, Cell-Safety, DriveSafe, iZUP, Key2SafeDriving Otter, Sprint Drive First, Strop Texting, Textecution, T-Mobile DriveSmart, Vlingo and tXtBlockers, also apply a similar strategy as that of DriveMode. Without giving any choice to cell phone users, these products automatically block calls, text messages and emails on a cell phone for a particular period of time, for a specific location, or for a pre-set condition such as one triggered by speed.

Most of these products are designed for blocking incoming information during driving, but failed to concern other situations where the incoming information would also be unwelcomed. Nevertheless, these products or applications unselectively block all the incoming information. Thus if the incoming information having importance and/or time-sensitiveness is arriving, it might be rejected as well. In addition, most of them do not have a two-way communication between the recipient who uses the cell phone and a sender who sends the incoming information to the recipient's cell phone. Thus, other than knowing the incoming information such as a call is rejected, the sender does not know why it is rejected and when would be the best time to make another call.

US patent application US20130097270 discloses a method of automatic response to the incoming information, wherein a cell phone may identify context data of a first incoming message, then send a response message to the sender. However, such determination and sending processes are performed automatically by a serious of modules. Once a condition for context data set and the first incoming message arrived, the recipient may not be able to intervene and control the responses to the incoming messages.

Thus, there is a need to develop a method to notify the sender with the recipient's status prior to or during sending the incoming information thus to avoid the unwanted information. There is also a need to develop a method to allow the recipient to actively control responses to the incoming information even during the status of unavailability so that important and/or time-sensitive information could be timely received by the recipient.

BRIEF SUMMARY OF THE INVENTION

The present invention is related to a method that allows a recipient to control incoming information to a first communication device during a pre-set status of unavailability. The incoming information includes but not limited to: calls, text messages and emails. According to one embodiment of the present invention, the method allows: (1), the recipient set up a status of unavailability in the first communication device; (2), the first communication device responds to the incoming information while the status is activated; and, (3), the recipient is asked to deny or allow the incoming information.

The present invention is further related to a two way communication between the first communication device which is usually possessed by the recipient and a second communication device which is usually possessed by a sender, wherein the present invention may synchronize the recipient's status in real-time on the second communication device, and the sender may be informed the recipient's status prior to or during sending the incoming information to the recipient. Specifically, the present invention is related to a two way communication between the first and the second communication devices, wherein the second communication devices may present a corresponding message of the recipient's status and a next available time for receiving information when the sender is trying to send information from the second communication device to the first communication device during the recipient's status of unavailability.

In one embodiment, the recipient may set up the status of unavailability from a list consisting: Driving, In a Meeting, In Class, and Napping. In a preferred embodiment, the recipient may create and name a new status not on the list.

In one embodiment, the recipient may set up the status for a single event. In yet another embodiment, the recipient may set up a schedule of the status for a repeated event. In a preferred embodiment, the recipient may introduce schedules or events from other sources, such as Outlook or other scheduling programs, to set up the status or the schedule of the status.

In one embodiment, when receiving incoming information during the status of unavailability, the present invention will notify the recipient of the incoming information, and presents to the recipient with two choices: allowance or denial.

In a preferred embodiment, all the incoming information during the unavailable status, weather allowed or denied, are recorded and stored. Said incoming information may be reviewed upon the recipient's request.

In one embodiment, the present invention may allow the recipient to set up the status in the first communication device and synchronize the status to the second communication device, such as the sender's cell phone. Therefore, the sender may check the recipient's availability before he or she decides to send information to the recipient.

In yet another embodiment, when the sender is sending information to the recipient during his or her status of unavailability, the present invention will present a message to the sender, notifying the current status of unavailability of the recipient and the next available time for the recipient to receive the information. Preferably, the present invention may further ask the sender whether he or she chooses to cancel sending information or continue regardless of the notification. The information would not be sent out from the second communication device unless the sender chooses to continue the sending process.

Accordingly, the present invention is advantageous in the following aspects: first, it provides a way for the recipient to reduce unwanted incoming information by setting up the status of unavailability; second, it allows the sender to be informed of the recipient's unavailability and next available time before and during sending out information to the recipient; third, it specifically records all the incoming information during the status, allowed or denied, for later reviews by the recipient; forth, it allows the recipient to selectively control the incoming information thus while other information may be denied, the most critical an most time-sensitive ones could be timely received.

DETAILED DESCRIPTION OF THE INVENTION

The present invention is related to a method of controlling a incoming information to a communication device during a status that is pre-set. The incoming information could be a call from a line phone, a call from a second cell phone, a text message, an email, an update or a notice from a social network such as Facebook or Twitter, or any other verbal, visual, and/or textual message may be received by the communication device. The communication device could be a cell phone, a computer, an iPad, or any device that may receive verbal, visual and/or textual message from a wire or a wireless network.

The present invention allows a recipient to set up the status of unavailability on a first communication device, which is usually possessed and controlled by the recipient. The status of unavailability may be synchronized in real-time from the first communication device to a second communication device, which is usually possessed and controlled by a sender of the incoming information.

In one embodiment, the present invention may be a software program implanting the application of the present invention, and operate on the communication device. It is to be noticed that its application is not restricted to a cell phone, or to a specific operating system such as those developed by Apple. In fact, it could adapt to any communication device and any operating system, provided the ways of adaption is well documented and/or practices in the art.

Figure 1:
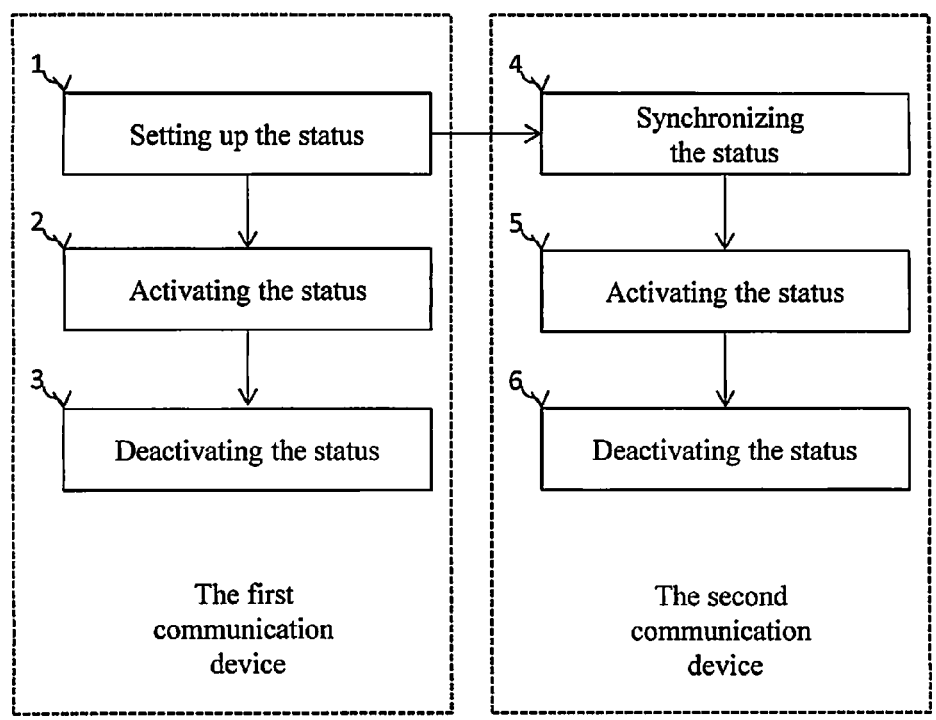
FIG. 1 is a flowchart representing a working model of one embodiment of the present invention.

In FIG. 1, the first step of the present invention is to set up the status of unavailability on the first communication device 1. The present invention then determines whether the status has been triggered. If yes, the status is activated 2. When the present invention determines that the status has passed, the status is deactivated 3.

According to another embodiment, when the status has been set up in the first communication device, the present invention automatically synchronizes the status to the second communication device 4. Thus, the status may be activated or deactivated on the second communication device, determined by the present invention 5&6.

Figure 2:
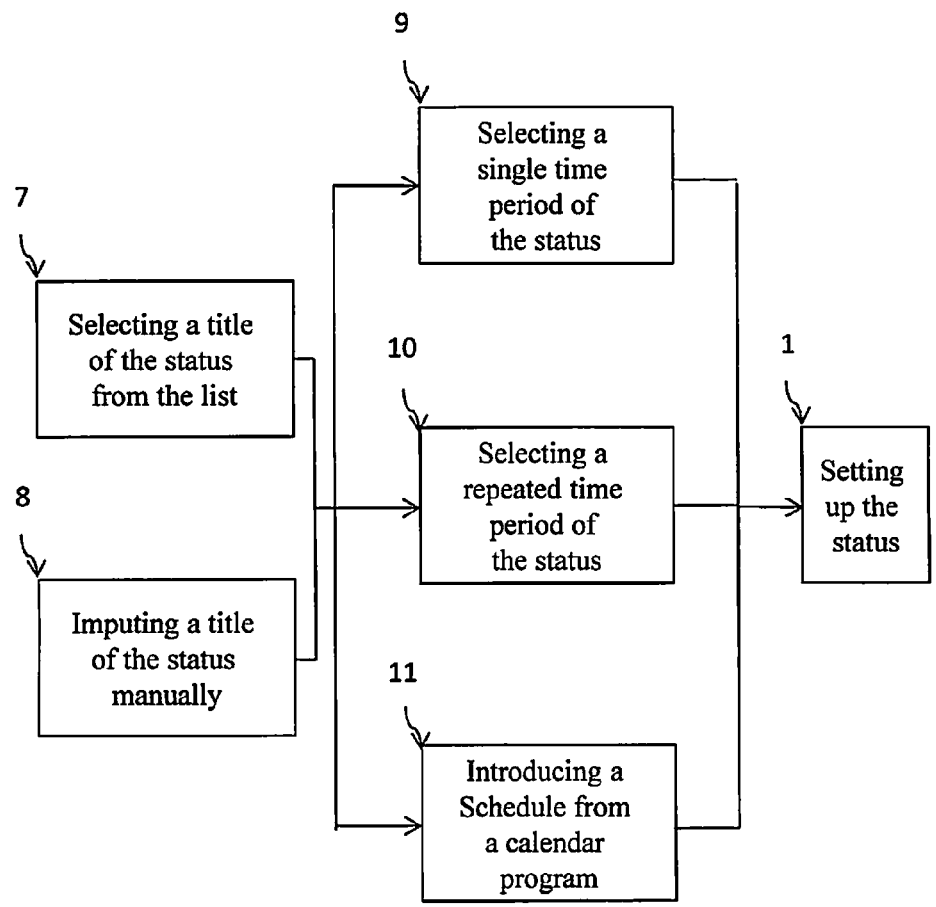
FIG. 2 is a flowchart representing a process of setting up the status in one embodiment of the present invention.

The status of unavailability must be set up in the present invention prior to its activation. In FIG. 2, there are multiple alternatives to set up the status. For example, a title of the status could be chosen from a list 7, or manually input 8.

In one embodiment, the title of the status can be selected from the list of the present invention wherein the recipient could choose from Driving, In a Meeting, In Class, Napping, etc. In yet another embodiment, the recipient could choose to make a new title. Thus, the recipient may manually input the title of the status. The manually input status will then be added onto the list.

After the title of the status selected, the recipient then can select a beginning time of the status, an end time of the status, and a date or dates of the status. The present invention will determine a corresponding time zone of the status using measurements known to the art. The recipient may choose to set the status for a particular date 9, for example, Monday, Sep. 2, 2013; or, he or she may choose to set a repeated status for particular dates 10, for example, every Monday, or for another example, Monday to Friday, Sep. 2, 2013 to Sep. 6, 2013.

For example, if the recipient has a meeting on Sep. 2, 2013, Monday from 9:00 AM to 10:00 AM, the recipient may set up the status of meeting by: (1) choosing the status title as "Meeting"; (2) choosing the starting time as 9:00 AM, Central time; (3) choosing the end time as 10:00 AM, Central time; and (4), choosing the date as Sep. 2, 2013, Monday.

For another example, if the recipient has a regular weekly meeting on 9:00 AM to 10:00 AM, every Monday, the recipient may set up a schedule of the status on every Monday from 9:00 AM to 10:00 AM, with a manually input title as "Weekly Meeting."

Figure 6:
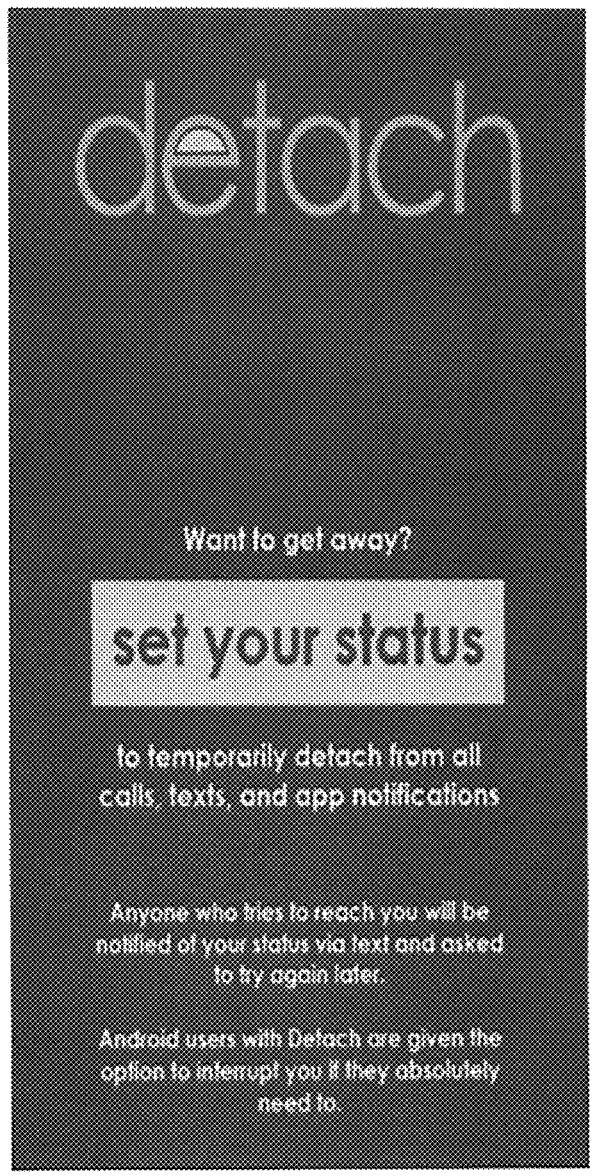
FIGS. 6-11 demonstrate content that may be presented on either the first or the second communication device before and during the status is activated.
Figure 7:
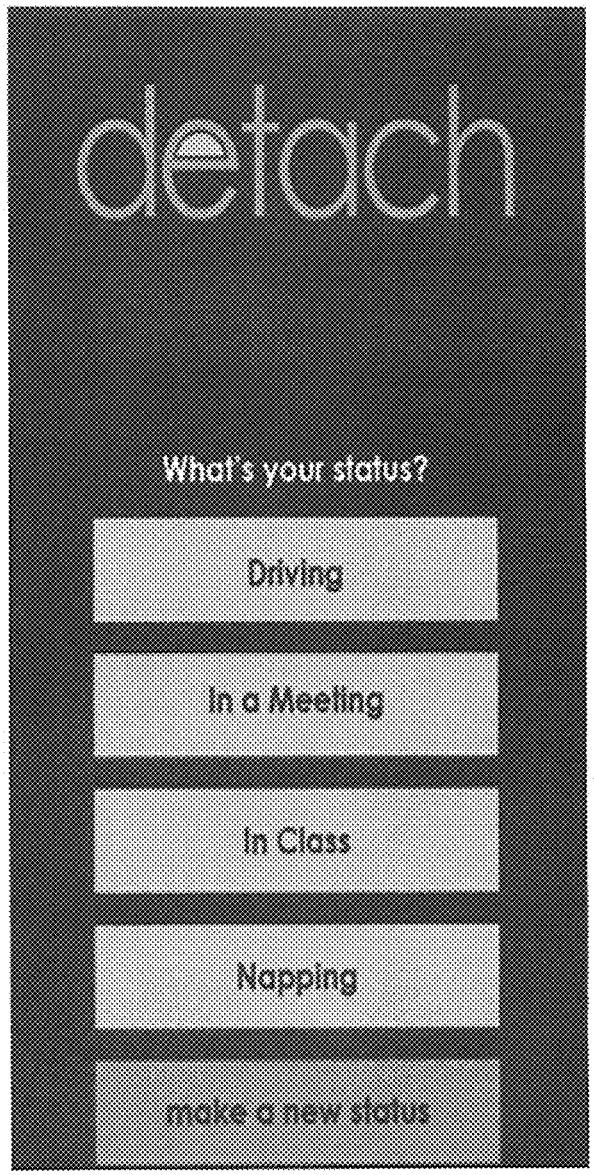

Preferably, the recipient may introduce his/her schedule directly from a calendar program, such as Outlook or any similar programs, to the first communication device as the schedule of the status 11. For example, if the recipient has a schedule of a meeting from 4:00 PM to 5:00 PM on every Friday which is booked in his or her Outlook calendar, the recipient may connect the calendar to the present invention, then option to introduce the schedule from the calendar to the present invention. The present invention then will automatically synchronize its schedules and statuses accordingly. Examples of setting up status are shown in FIGS. 6&7.

It is to be noticed that the present invention allows the beginning time, the end time and the date of the status to be reset at any time, even when the status of unavailability is activated.

Figure 3:
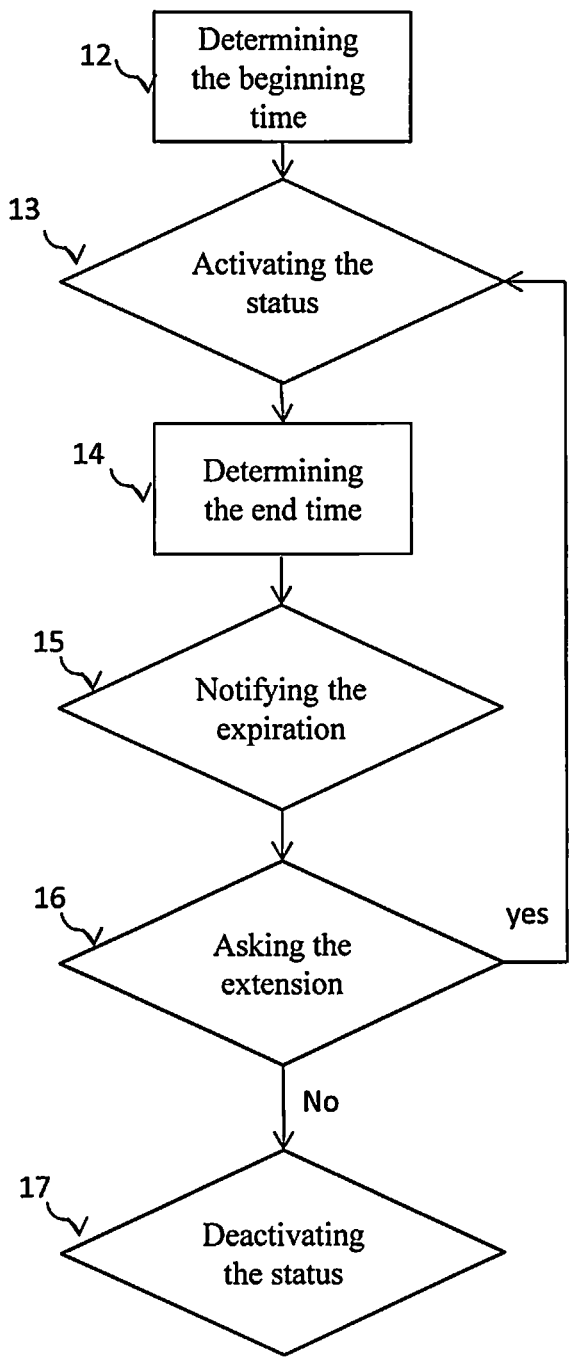
FIG. 3 is a flowchart representing the activation and the deactivation processes in one embodiment of the present invention.

As shown in FIG. 3, the status may be activated when a time sensor determines that the time on the first or the second communication device carrying the present invention falls within the beginning time and the end time of the status 12&13. The time sensor may be the communication device itself which is incorporated a clock function or any other device or program that may connect to the communication device or the present invention to provide information of timing. The types of the time sensor and the manner it provides information to the present invention are well documented and/or practiced in the art.

The status may be deactivated when the time sensor determines that the time on the communication device carrying the present invention falls without the beginning time and the end time of the status 14&17. Thus, as the present invention approaches to the end time, the present invention is about to be deactivated, or in other words, the status is about to be "expired."

According to one embodiment of the present invention also shown in FIG. 3, minutes prior to the expiration of the status, the present invention may present an expiration notification on the first communication device, informing the recipient that the status is about to be expired 15. The expiration notification could come at any form known to the skilled in the art. For example, it could be a textual or graphical message, a ring tone, or a vibration.

Preferably, in addition to the expiration notification, the present invention may further ask the recipient whether he or she would like to: (1) allow the time to expire; or, (2) extend the status. In a preferred embodiment, pressing a button of "extending the status" allows the status to be extended by a certain amount of time 16. For example, pressing a button of the "extending the status" in one embodiment of the present invention extends the status of unavailability by 10 minutes, pressing said button twice allows the status to be extended by 20 minutes, and pressing three times extends the status by 30 minutes. It is to be noticed that the above embodiment is merely served as an example. The present invention is not restricted to the manners of extending the status before its expiration.

According to another embodiment of the present invention, the present invention may allow the status to be set or re-set at any time, by choosing a new title of status, a new date, a new beginning time and/or a new end time.

According to the present invention, the status may be set by conditions other than a time period as described hereabove. For example, a geographic restriction or geographic location may be utilized to set up a status. Thus, the status is activated when the cell phone carrying the Present invention enters the geographic restriction, and the status is deactivated when the cell phone carrying the Present invention exits the geographic restriction. The geographic restriction may be determined by a location sensor such as a GPS sensing device or program that is incorporated or connected to the cell phone. The types of the location sensor and the manner of providing geographic information from the location sensor to the Present invention are well documented and/or practiced in the art.

According to the present invention, the geographic restriction may be further determined by devices and programs other than those based on GPS signals. For example, the geographic restriction could be defined by wireless signals such as Wi-Fi signals, wireless network signals, or other electrical signals sourced from a particular location, or labeled by a particular name/purpose. For example, the status could be activated when the cell phone enters a range of Wi-Fi signal of "my company" and deactivated when the cell phone exits the range. The types of utilizing and determining the signals are well known in the art.

According to the present invention, the status may further be set by other specific conditions. For example, in one embodiment, the status may be set for a speed limit, such as higher than 20 MPH. Thus, when a speed sensor connected to the Present invention determines that the speed of the cell phone is exceeding 20 MPH, the status will be activated.

According to the present invention, if the incoming information is being sent from the second communication device when the status is activated, the present invention will trigger subsequent steps.

According to one embodiment of the present invention, the subsequent steps for the status consist of following: (1), displaying a corresponding message on the second communication device; (2) asking the sender whether he or she would like to continue sending the information; (3) if the sender decides to cease sending the information, dropping the incoming information and recording the time and the sender's ID of the incoming information; and, (4) if the sender decides to continue sending the information, sending out the information to the first communication device.

At the same time, upon receiving the incoming information, the present invention in the first communication device will: (1), notifying the recipient on the first communication device and asking whether to deny or allow the incoming information; (2) if the recipient chooses to deny the information, recording the time and the sender's ID of the incoming information; and, (3) if the recipient chooses to allow the information, connecting the information, and recording the time and the sender's ID of the incoming information.

According to the present invention, when the status is activated, if the sender is trying to send out the incoming information by selecting a sending option, such as a enter key on a keyboard, a connecting button on a cell phone, or a sending option in a program, the second communication device will not send out the incoming information from the second communication device immediately. Instead, it will withhold the sending process and display a corresponding message to the sender. The corresponding message serves function as to notify the sender that the recipient is on the status of unavailability. The present invention will release the withheld incoming information and allow it to be sent out from the second communication device only after the sender confirms and continues sending process in subsequent steps.

The corresponding messages and the subsequent steps may be varied based on the natures of the incoming information. For example, the incoming information may be a call from a lined phone, a call from a second cell phone, a text message, an email, or any other forms of information known in the art.

According to the present invention, the corresponding messages could be vocal, visual or textual. It includes, but not limited to text messages, voice announcements, and corresponding emails. Thus, for example, under the status of unavailability which tilted as "In a Meeting", a corresponding text message may contain a following context: "(The recipient) is current In a Meeting from (the beginning time) to (the end time) thus is unavailable to receive your call. Please call back after (the end time)." The context of the corresponding message may be pre-set and stored in the Present invention, or manually input or altered by the recipient.

For example, if the incoming information is the call from the lined phone, the corresponding message may be a pre-recorded or synthesized voice message informing the sender that the recipient is at a status of unavailability and the next available time for the recipient. The next available time may be the time immediately after the end time of the status. In yet another embodiment, the sender may be further asked whether he or she would like to (1) hand over the phone; (2) leave a voice mail; and (3) continue calling the recipient. In a preferred embodiment, the recipient may be asked to leave a voice mail, which would be recorded by the present invention.

Figure 4:
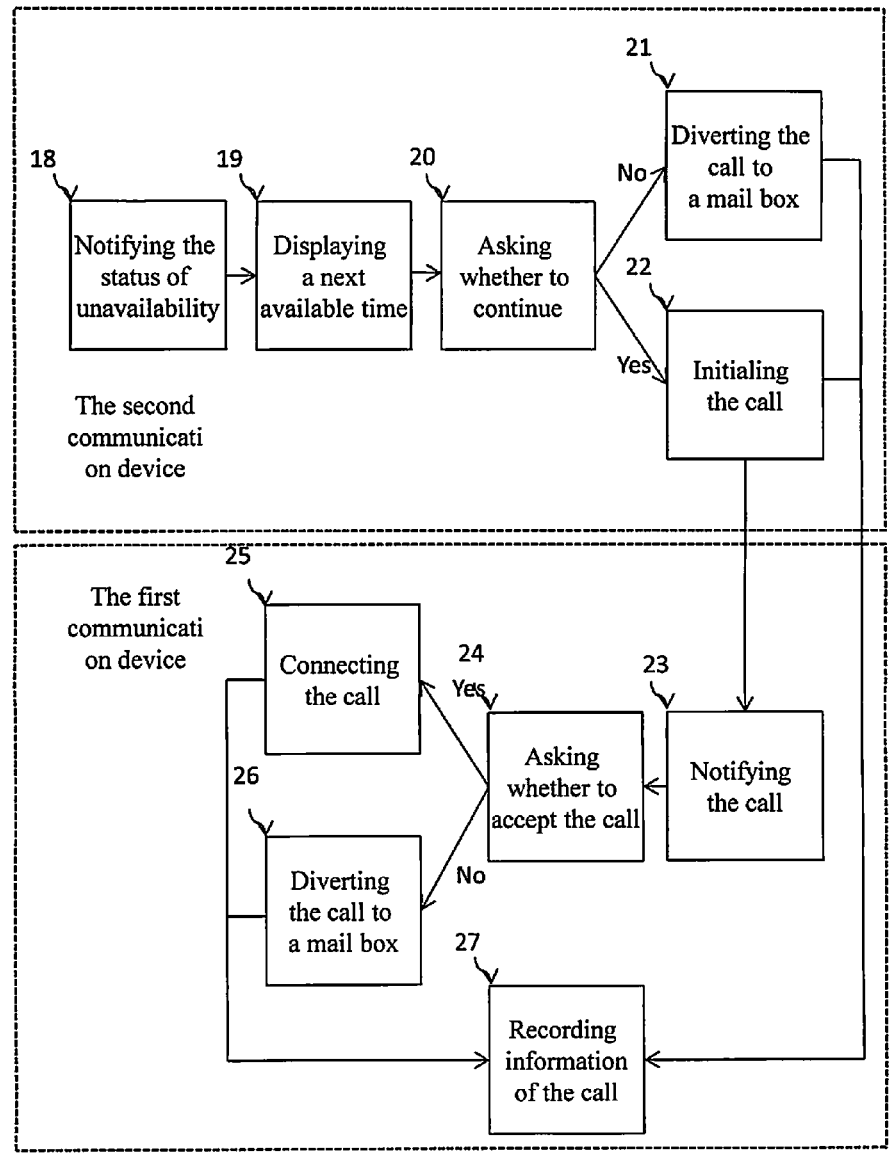
FIG. 4 is a flowchart representing a working model of one embodiment of the present invention when the status is activated.

For another example illustrated in FIG. 4, if the incoming information is the call from the second communication device such as a second cell phone, before the call is sent out from said device, the present invention may display a textual notice on the screen of said device, informing the sender that the recipient is at the status of unavailability, and display the next available time for the recipient 18&19. In yet another embodiment, the sender may be further asked whether he or she would like to leave a voice mail or continue calling the recipient 20. If the sender chooses to discontinue the call and leave the voice mail, the call is diverted to a voice mail box 21. If the sender chooses to continue, the present invention will initial the call by sending out the call from the second communication device 22.

Figure 8:
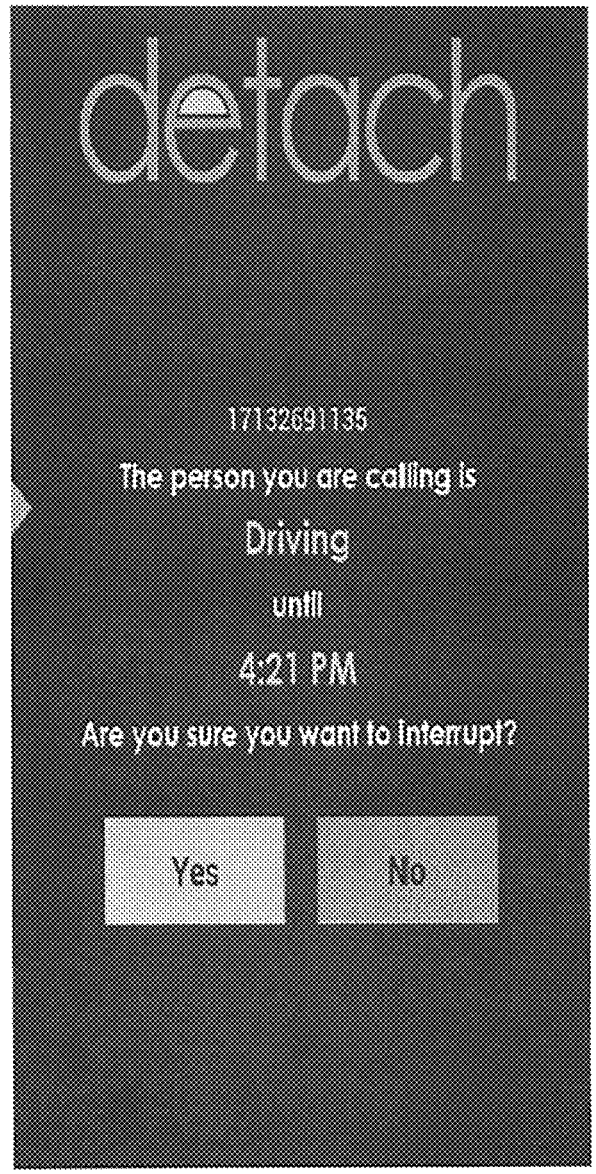
Figure 9:
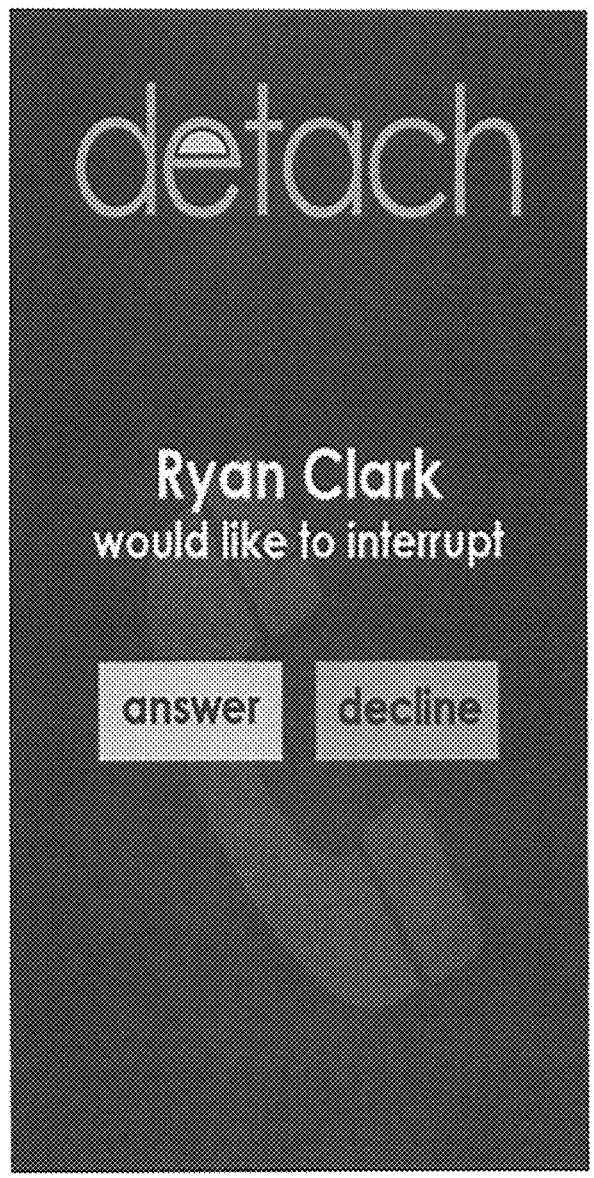

Accordingly, if the sender chooses to continue calling, the first device then will receive the call and notify the recipient of this incoming call 23. The present invention may notify the recipient by any of following pre-set manners, but not limited to: rings, vibrations, tones, visual signals, or any manner known in the art. The recipient is further asked whether to accept the call 24. If yes, the call will be connected 25. If not, the call will be diverted into the voice mail box 26. Examples of the present invention's notifications to the sender and the recipient may be shown in FIGS. 8&9.

Figure 10:
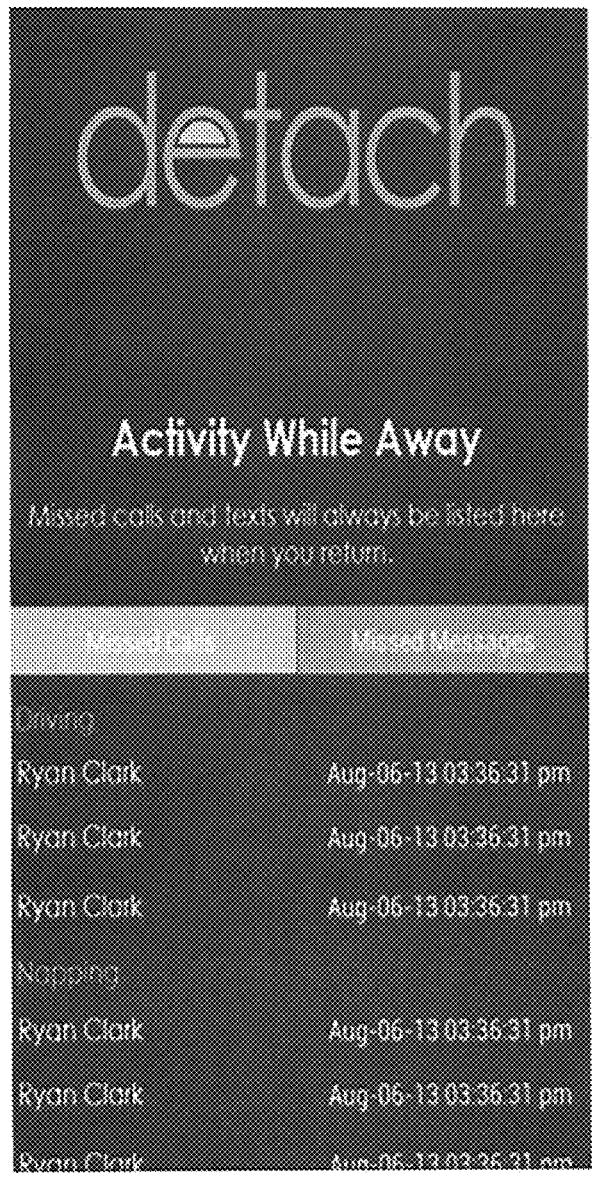

According to one embodiment of the present invention, information such as the time of the call and whether the call is diverted or connected will be recorded by the present invention. Said information is then synchronized to the first communication device so that the recipient may be able to review all the calls made during the status, the times of the calls, the senders of the calls, and the responses to the calls 27. An example of the recorded information is shown in FIG. 10.

For another example, if the incoming information is the text message or the email, the time of, the sender of and the responses to the message or the email will be recorded by the present invention for later reviews.

Figure 5:
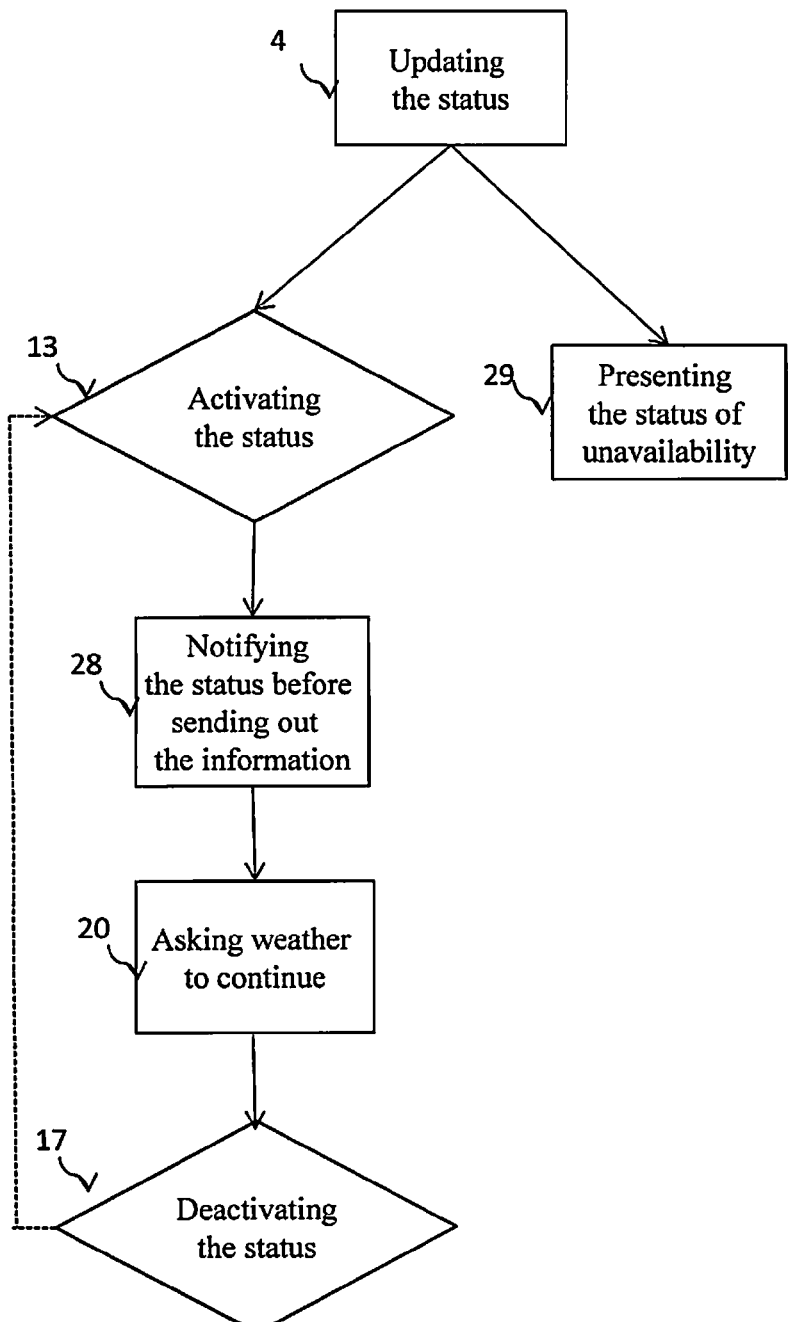
FIG. 5 is a flowchart representing the functions presented in the second communication device in one embodiment of the present invention.

According to one embodiment illustrated in FIG. 5, when the status is set up, the present invention will automatically synchronize the recipient's statuses to the second communication device in real time 4. Thus, if the sender is trying to send information to the recipient form the second communication device when the status is activated, the present invention will notify the sender, by vocal, visual or textual messages, that the status of the recipient and the next available time 13, 28&17. The present invention will further ask the sender whether he or she would like to cancel or continue the sending 20. If the sender chooses to continue, the information will then be sent.

In a preferred embodiment also illustrated in FIG. 5, the present invention allows the sender to check the recipient's status before entering a process of sending out the incoming information 29. For example, before entering numbers to make a call, the sender may visit the present invention on the second communication device to check whether the recipient is on the status of unavailability and if yes, when would be the recipient's next available time.

Figure 11:
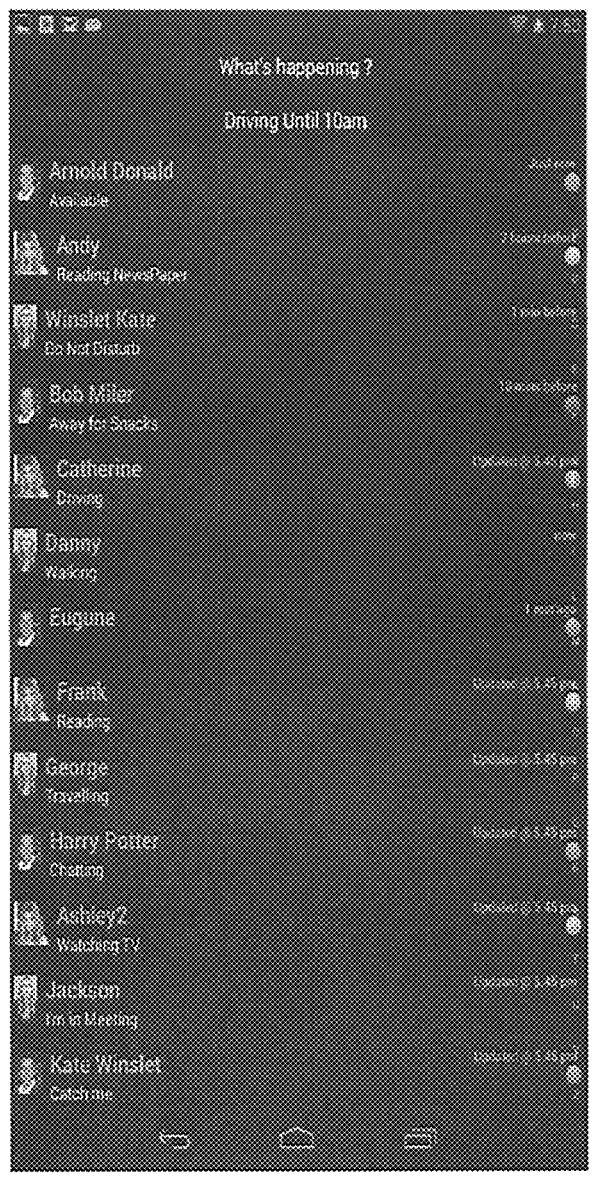

For another example, the recipient's status is incorporated into the phone book or any similar contract organizing program on the second communication device. If the recipient is not in the status, the present invention may display a green dot beside the recipient's name; if the recipient is currently in the status of unavailability, the present invention may display a red dot beside the recipient's name as shown in FIG. 11. Thus the sender may be notified of the recipient's unavailability when scrolling down the phone book. If necessary, the sender may further check details of the status and next available time.

Thus, according to one embodiment, the present invention allows a second thought of the sender prior to the sender sending out information from the second communication device and prior to the recipient being notified of said information. Thus, if the information is not critical or time-sensitive, the sender may decide to cease the sending process, and leave the recipient undisturbed. However, the present invention will record the time and sender's ID even if the recipient is not notified during the status. Thus, the recipient may always come back to check whether he or she was contacted during the status of unavailability.

It is to be understood that the use of "including", "comprising" or "having" and variations thereof herein is meant to encompass the items listed thereafter and equivalents thereof as well as additional items; the terms "a" and "an" herein do not denote a limitation of quantity, but rather denote the presence of at least one of the referenced item; and, the use of terms "first", "second", and the like, herein do not denote any order, quantity, or importance, but rather are used to distinguish one element from another.

It is to be understood that the above embodiments and examples are provided as illustrations only, and do not in any way restrict or define the scope of the present invention. Various other embodiments may also be within the scope of the claims.

What is claimed is:

1. A method of controlling incoming information to a first communication device from a second communication device, the method comprising:
   A. setting a status of unavailability in the first communication device, wherein the status of unavailability comprises a title, a beginning time, an end time, and a date of the status;
   B. synchronizing the status in real time in the second communication device;
   C. activating the status in the first and the second communication devices when a time sensor determines that the time is between the beginning time and the end time of the status;
   D. when a sender controlling the second communication device is trying to send out incoming information when the status is activated:
   withholding sending the incoming information from the second communication device to the first communication device until a message is displayed on the second communication device, wherein the message notifies the sender of the status, and queries the sender whether it wishes to continue sending the incoming information, and the sender indicates by return communication that it wishes to send the incoming information, then sending the incoming information from the second communication device;
   E. notifying a recipient controlling the first communication device that the incoming information has been sent; and
   F. querying the recipient whether to accept and review the incoming information, and accepting the incoming information for review only if the recipient indicates they wish to accept it.

2. The method of claim 1 wherein the title, the beginning time, the end time, and/or the date may be re-set at any time by choosing a new date, a new beginning time and/or a new end time.

3. The method of claim 1, wherein the message could be vocal, visual or textual.

4. The method of claim 1, wherein the status may be introduced from a calendar program.

5. A method of controlling incoming information to a first communication device from a second communication device, the method comprising:
   A. setting a status of unavailability in the first communication device, wherein the status of unavailability comprises a title of the status;
   B. synchronizing the status in real time in the second communication device;
   C. activating the status based on a geographic restriction, or a speed limit;
   D. when a sender controlling the second communication device is trying to send out the incoming information when the status is activated:
   withholding sending the incoming information from the second communication device to the first communication device until a message is displayed on the second communication device, wherein the message notifies the sender of the status, and queries the sender whether it wishes to continue sending the incoming information, and the sender indicates by return communication that it wishes to send the incoming information, then sending the incoming information from the second communication device;
   E. notifying a recipient controlling the first communication device that the incoming information has been sent; and
   F. querying the recipient whether to accept and review the incoming information, and accepting the incoming information for review only if the recipient indicates they wish to accept it.

6. The method of claim 5, wherein the message could be vocal, visual or textual.

7. The method of claim 5, wherein the sender is allowed to check the recipient's status before entering a process of sending out the incoming information by checking the recipient's status.

* * * * *